UNITED STATES PATENT OFFICE.

CHARLES A. DOREMUS, OF NEW YORK, N. Y.

PROCESS OF TREATING KRYOLITH.

SPECIFICATION forming part of Letters Patent No. 660,094, dated October 23, 1900.

Application filed December 27, 1899. Serial No. 741,710. (No specimens.)

*To all whom it may concern:*

Be it known that I, CHARLES A. DOREMUS, a citizen of the United States, residing in the borough of Manhattan, city, county, and State of New York, have invented a new and useful Process of Treating Kryolith, of which the following is a specification.

The mineral kryolith is a double fluorid of aluminium and sodium, the chemical formula of which is $Al_2F_6 6NaF$.

Although several different processes have been used for the chemical treatment of kryolith on a manufacturing commercial scale, the one now chiefly employed consists of furnacing with lime. Sodium aluminate and calcium fluorid result. The former is separated from the latter by leaching. The calcium fluorid is quite impure and is of little value. The fluorin, therefore, amounting to fifty-four per cent. of the weight of the kryolith, is not obtained in a serviceable form.

My object has been to devise a method for obtaining important fluorin compounds, while at the same time preserving the full value of the other components of the kryolith. This new result I have accomplished by heating the kryolith in the presence of steam, as hereinafter set forth, to liberate hydrofluoric acid and leave a residue consisting either of sodium aluminate or of a mixture of sodium fluorid and alumina or of a mixture of sodium aluminate, sodium fluorid, and alumina.

I have found that when steam is allowed to act on kryolith at a temperature below its melting-point the kryolith and steam become hydrofluoric acid and sodium aluminate; also, that when steam is allowed to act on molten kryolith hydrofluoric acid is set free and sodium aluminate is formed until the increasing proportion of the latter solidifies the molten mass; also, that when this solidified mass is further treated by steam sodium aluminate remains, while hydrofluoric acid escapes; also, that any of the above reactions can be brought about by the products of combustion of fuel consisting of or containing hydrogen, watery vapor or steam being the product or one of the products of the combustion; also, that when kryolith is heated with steam the silicon present is evolved as silicon fluorid, and thus removed from the alumina or aluminate; also, that when alumina or a hydrate, such as bauxite, is heated with kryolith and steam a soluble aluminate is formed and hydrofluoric acid escapes; also, that by the treatment with kryolith and steam even a greater proportion of alumina or a hydrate of alumina than is needed to form an aluminate will be rendered soluble in acid or alkali; also, that when kryolith is heated with a hydrate, such as aluminium hydrate, the steam evolved by the action of the heat on the hydrate will react with the kryolith and hydrofluoric acid is set free and sodium aluminate or sodium fluorid and alumina, or a mixture of these, remains, together with alumina from the hydrate.

The above-mentioned chemical reactions may be carried out through the use of different mechanical devices, of which the following are illustrations:

I. Kryolith is placed in an iron retort and heated from the exterior. Steam is passed, hydrofluoric acid is disengaged, and sodium aluminate or sodium fluorid and alumina, or a mixture of these, remains in the retort. The reaction is controlled by the regulation of the heat and the passage of the steam. The products of the combustion of a fuel consisting of or containing hydrogen may be substituted for the externally-applied heat by allowing said products to pass through the retort or through an oven containing the kryolith.

II. Kryolith is placed in the hearth of a reverberatory furnace, and, when molten, steam is made to impinge on the molten mass. Hydrofluoric acid escapes abundantly until the mass stiffens through the production of aluminate or of sodium fluorid and alumina, or a mixture of these. This solid residue is then subjected to further treatment with heat and steam or heated with the products of combustion containing steam.

III. Kryolith is heated in a mechanical furnace by a fuel consisting of or containing hydrogen. The processing may be made to convert a part or the whole of the fluorin into hydrofluoric acid. In this case I have found it advantageous to add alumina or bauxite in order to prevent balling and to obtain an aluminate containing a high proportion of alumina. An excess of alumina or bauxite above the proportion needed to form the aluminate will under this treatment be rendred soluble in acid or alkali. The mechanical disintegration of infusible aluminate helps to complete the removal of the fluorin.

IV. Kryolith is made into briquets with an aluminium hydrate, such as bauxite, and these are heated in a furnace or oven either with or without the addition of steam or of steam produced by the combustion of a fuel consisting of or containing hydrogen. Hydrofluoric acid is evolved, and the residue consists of sodium aluminate or sodium aluminate and alumina or sodium fluorid and alumina, or a mixture of these. When only a part of the fluorin is removed from the kryolith in any of the foregoing cases, the remainder may be converted to calcium fluorid by heating with lime.

V. Kryolith is placed in a muffle-furnace, lined with material which will not be acted on by the fused mass, and is melted. Steam is then made to impinge upon or to pass through the molten kryolith so long as the mass remains fluid. Hydrofluoric acid escapes, and the residue, when withdrawn, is treated either for the conversion of the fluorin remaining in it into hydrofluoric acid or is otherwise processed, as deemed expedient.

In each of the foregoing instances the silicon present in the kryolith is converted into gaseous silicon fluorid. The sulfids and carbonates present in the kryolith are converted into oxids.

Having set forth the process and described several modes of conducting the same, what I claim as new, and desire to secure by Letters Patent, is—

1. The process of treating kryolith which consists in heating the kryolith, in the presence of steam, to a temperature below a white heat, substantially as described.

2. The process of converting kryolith into sodium aluminate and hydrofluoric acid, which consists in passing steam through or over and into contact with the kryolith at a temperature below a white heat, substantially as described.

3. The process of treating kryolith to obtain hydrofluoric acid, sodium fluorid and alumina, which consists in heating the kryolith in the presence of steam, and at a temperature below the melting-point of kryolith, substantially as described.

CHARLES A. DOREMUS.

Witnesses:
A. W. WILKINSON,
H. S. BOWLES.